United States Patent
Hachisuka et al.

(10) Patent No.: US 6,340,885 B1
(45) Date of Patent: Jan. 22, 2002

(54) METHOD AND APPARATUS FOR TESTING COMPOSITE TYPE MAGNETIC HEAD

(75) Inventors: Nozomu Hachisuka; Toshiaki Maeda; Kenji Inage, all of Nagano (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/196,442

(22) Filed: Nov. 20, 1998

(30) Foreign Application Priority Data

Oct. 2, 1998 (JP) .......................................... 10-294725

(51) Int. Cl.[7] .................... G01R 33/12; G11B 5/455; G11B 5/39

(52) U.S. Cl. ...................................... 324/210; 324/235

(58) Field of Search ................................ 324/210, 252, 324/232, 235, 223, 211, 212, 213; 29/593; 360/313, 317, 318, 318.1

(56) References Cited

U.S. PATENT DOCUMENTS 5,721,488 A    2/1998   Sakai et al.

FOREIGN PATENT DOCUMENTS

JP          6-150264      5/1994

*Primary Examiner*—Walter E. Snow
(74) *Attorney, Agent, or Firm*—Arent Fox Kintner Plotkin & Kahn, PLLC

(57) ABSTRACT

A current which will change an initial magnetization state of a shield layer for a MR element is applied to an inductive element, and output characteristics of the MR element is measured.

27 Claims, 5 Drawing Sheets

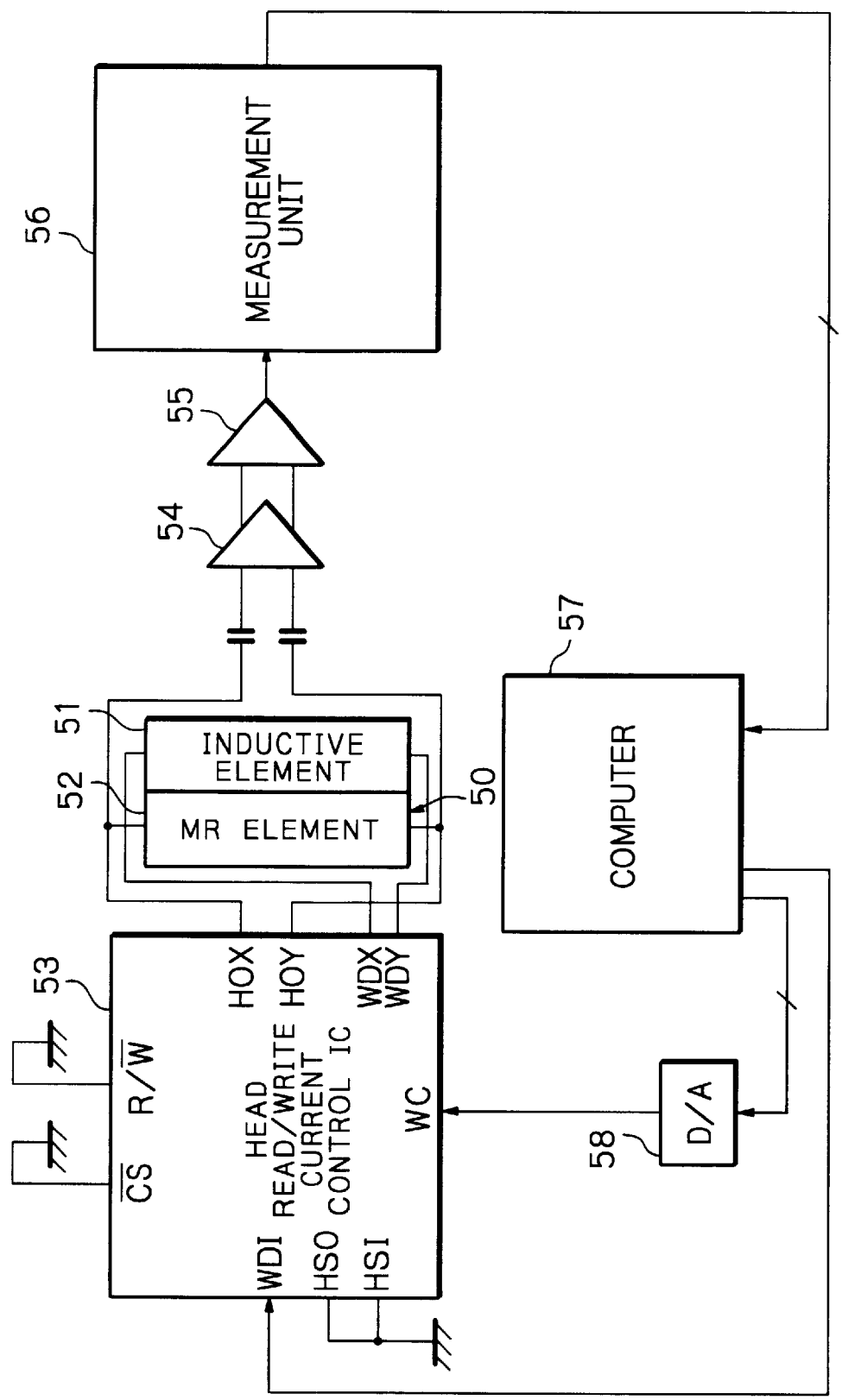

METHOD AND APPARATUS FOR TESTING COMPOSITE TYPE MAGNETIC HEAD

FIELD OF THE INVENTION

The present invention relates to a method and apparatus for testing a composite type magnetic head which has a read head portion with a magnetoresistive effect (MR) element for reproducing data from a magnetic medium such as a magnetic disk, and a write head portion with an inductive element for recording data into the magnetic medium.

DESCRIPTION OF THE RELATED ART

The composite type magnetic heads described above have been broadly utilized as thin-film magnetic heads for reading data from and/or writing data into the magnetic medium such as the magnetic disk. Recently, a magnetic head with a giant magnetoresistive effect (GMR) element such as a spin-valve MR element or with a tunnel magnetoresistive effect (TMR) element has been developed to increase magnetic recording density, instead of a usual magnetic head with an anisotropic magnetoresistive effect (AMR) element.

At each test after manufacturing such magnetic head, it is necessary to confirm that the finished magnetic head with a MR element is a good article and may not produce any inherent noise such as Barkhausen noise. Japanese Patent Unexamined Publication No.6 (1994)-150264 of the same assignee as that of the present application discloses a MR head testing method. In this testing method, an external alternating magnetic field is applied, in a direction perpendicular to an Air Bearing Surface (ABS), to a plurality of MR heads which are aligned on a head block and are not yet individually separated, and electromagnetic transfer characteristics of each of the MR heads under the varying external magnetic field is measured. By means of this conventional testing method, whether Barkhausen noise is produced or not can be easily checked.

U.S. Pat. No. 5,721,488 of the same assignee as that of the present application discloses an improved MR head testing method. In this testing method, alternating leakage magnetic field with a high frequency excited by a write current flowing through an inductive element is applied to the MR element in addition to external alternating magnetic field which is applied to the MR element in a direction perpendicular to the ABS of the head block, and electromagnetic conversion characteristics of each of the MR heads under the varying external and leakage magnetic fields is measured. By means of this testing method disclosed in U.S. patent, possible Barkhausen noise can be detected with a high probability.

These known testing methods using the electromagnetic conversion characteristics measuring device can be used for detecting whether Barkhausen noise is produced or not but cannot be applied for detecting instability of output of the MR element, which is different from abnormal output of the MR element due to Barkhausen noise. In fact, when outputs of the MR element of the composite type magnetic head are repeatedly measured by means of the electromagnetic conversion characteristics measuring device, the output wave shapes of the MR element sometimes vary due to some reason and thus the same output level cannot be always obtained resulting poor reproducibility.

Therefore, according to the conventional testing method, it is impossible to detect instability of output of the MR element except that extremely many times of the test are repeated to increase the probability of the detection. However, the great number of the repetition times of the test will invite manufacturing efficiency of the head to extremely lower.

Particularly, the composite type magnetic head with the GMR element or the TMR element may easily trigger the output instability because such magnetic head has high sensitivity and complicated structure and therefore is susceptible to its environment.

SUMMARY OF THE INVENTION

It is therefore an object of the present invention to provide a method and apparatus for testing a composite type magnetic head, whereby easy and reliable test with respect to instability of output of a MR element can be attained.

According to the present invention, a method for testing a composite type magnetic head having a MR element with at least one shield layer and an inductive element include a current application step of applying a current to the inductive element, which current will change an initial magnetization state of the shield layer for the MR element, and a measurement step of measuring output characteristics of the MR element.

Also, according to the present invention, an apparatus for testing a composite type magnetic head having a MR element with at least one shield layer and an inductive element, includes a first current application means for applying a current to the inductive element, which current will change an initial magnetization state of the shield layer for the MR element, a second current application means for applying a sense current to the MR element, and measurement means for measuring output characteristics of the MR element by receiving output voltage from the MR element each time the current is applied to the inductive element from the first current application means while the sense current is flowing.

Furthermore, according to the present invention, an apparatus for testing a composite type magnetic head having a MR element with at least one shield layer and terminals, having an inductive element with terminals, and having an air bearing surface, include probe means for electrically contacting to the terminals of the MR element and to the terminals of the inductive element, a first current application means for applying a current to the inductive element through the probe means, which current will change an initial magnetization state of the shield layer for the MR element, means for applying external magnetic field to the magnetic head, the external magnetic field being perpendicular to the air bearing surface, a second current application means for applying a sense current to the MR element through the probe means, and measurement means for measuring output characteristics of the MR element by receiving output voltage from the MR element through the probe means each time the current is applied to the inductive element from the first current application means while the sense current and the external magnetic field are being applied.

The current which will change an initial magnetization state of the shield layer for the MR element is applied to the inductive element, and output characteristics of the MR element is measured. According to the present invention, output characteristics of the MR element is not merely measured but is measured under a condition wherein possible instability of the output of the MR element will be intentionally induced by forcefully applying to the inductive element a current which will change an initial magnetization state of a shield layer for the MR element. It is impossible to increase the probability of detection of instability of output of the MR element only by applying a high frequency write current to the inductive element as done in the conventional art. By applying current which will change an initial magnetization state of the shield layer for the MR element is applied to the inductive element as the present invention, possible output instability will be easily induced. Thus, according to the present invention, possible output instability of the MR element can be tested without increasing the number of the repetition times of the test.

It is preferred that the applied current is a direct current with a predetermined polarity, and that output characteristics of the MR element is measured while the applied direct current is flowing.

It is also preferred that the applied current is a current which finally falls to zero from a predetermined polarity to the inductive element, and that output characteristics of the MR element is measured after application of the current is finished.

According to the present invention, furthermore, a method for testing a composite type magnetic head having a MR element and an inductive element, includes a first current application step of applying a first current with one polarity to the inductive element, a first measurement step of measuring output characteristics of the MR element, a second current application step of applying a second current with the other polarity to the inductive element, and a second measurement step of measuring output characteristics of the MR element.

Also, according to the present invention, an apparatus for testing a composite type magnetic head having a MR element and an inductive element, includes a first current application means for applying a first current with one polarity and a second current with the other polarity to the inductive element, a second current application means for applying a sense current to the MR element, and measurement means for measuring output characteristics of the MR element by receiving output voltage from the MR element when the first current is applied to the inductive element from the first current application means while the sense current is being applied, and for measuring output characteristics of the MR element by receiving output voltage from the MR element when the second current is applied to the inductive element from the first current application means while the sense current is being applied.

According to the present invention, also, an apparatus for testing a composite type magnetic head having a MR element with at least one shield layer and terminals, having an inductive element with terminals, and having an air bearing surface, includes probe means for electrically contacting to the terminals of the MR element and to the terminals of the inductive element, a first current application means for applying a first current with one polarity and a second current with the other polarity to the inductive element through the probe means, means for applying external magnetic field to the magnetic head, the external magnetic field being perpendicular to the air bearing surface, a second current application means for applying a sense current to the MR element through the probe means, and measurement means for measuring output characteristics of the MR element by receiving output voltage from the MR element through the probe means when the first current is applied to the inductive element from the first current application means while the sense current and the external magnetic field are being applied, and for measuring output characteristics of the MR element by receiving output voltage from the MR element through the probe means when the second current is applied to the inductive element from the first current application means while the sense current and the external magnetic field are being applied.

The output characteristics of the MR element is detected when a current with one polarity is applied to the inductive element, and the output characteristics of the MR element is detected when a current with the other polarity is applied to the inductive element. As mentioned before, according to the present invention, output characteristics of the MR element is measured under a condition wherein possible instability of the output of the MR element will be intentionally induced by forcefully applying to the inductive element a current which will change an initial magnetization state of a shield layer for the MR element. However, since it is impossible to previously know that, for each MR element, which polarity of the applied current will change the initial magnetization state of the shield layer, the output characteristics of each MR element should be measured by using a plurality of currents with positive and negative polarities, respectively. Thus, at least twice measurements each applying a current with different polarity to the inductive element are executed.

It is preferred that the first and second currents are direct currents, and that output characteristics of the MR element is measured while the applied direct currents are flowing, respectively.

It is also preferred that the first current finally falls to zero from one polarity to the inductive element, that the second current finally falls to zero from the other polarity to the inductive element, and that output characteristics of the MR element is measured after application of the first and second currents are finished, respectively.

In the latter case, each of the first and second currents may be a single rectangular wave shape current with a predetermined duration, an alternating rectangular wave shape current with a predetermined frequency, or a sinusoidal wave shape current with a predetermined frequency.

Further objects and advantages of the present invention will be apparent from the following description of the preferred embodiments of the invention as illustrated in the accompanying drawings.

DESCRIPTION OF THE PREFERRED EMBODIMENTS

FIG. 5 is a block diagram schematically showing a circuit structure of another embodiment of an apparatus for testing a composite type magnetic head, according to the present invention.

DESCRIPTION OF THE PREFERRED EMBODIMENTS

Figure 1:
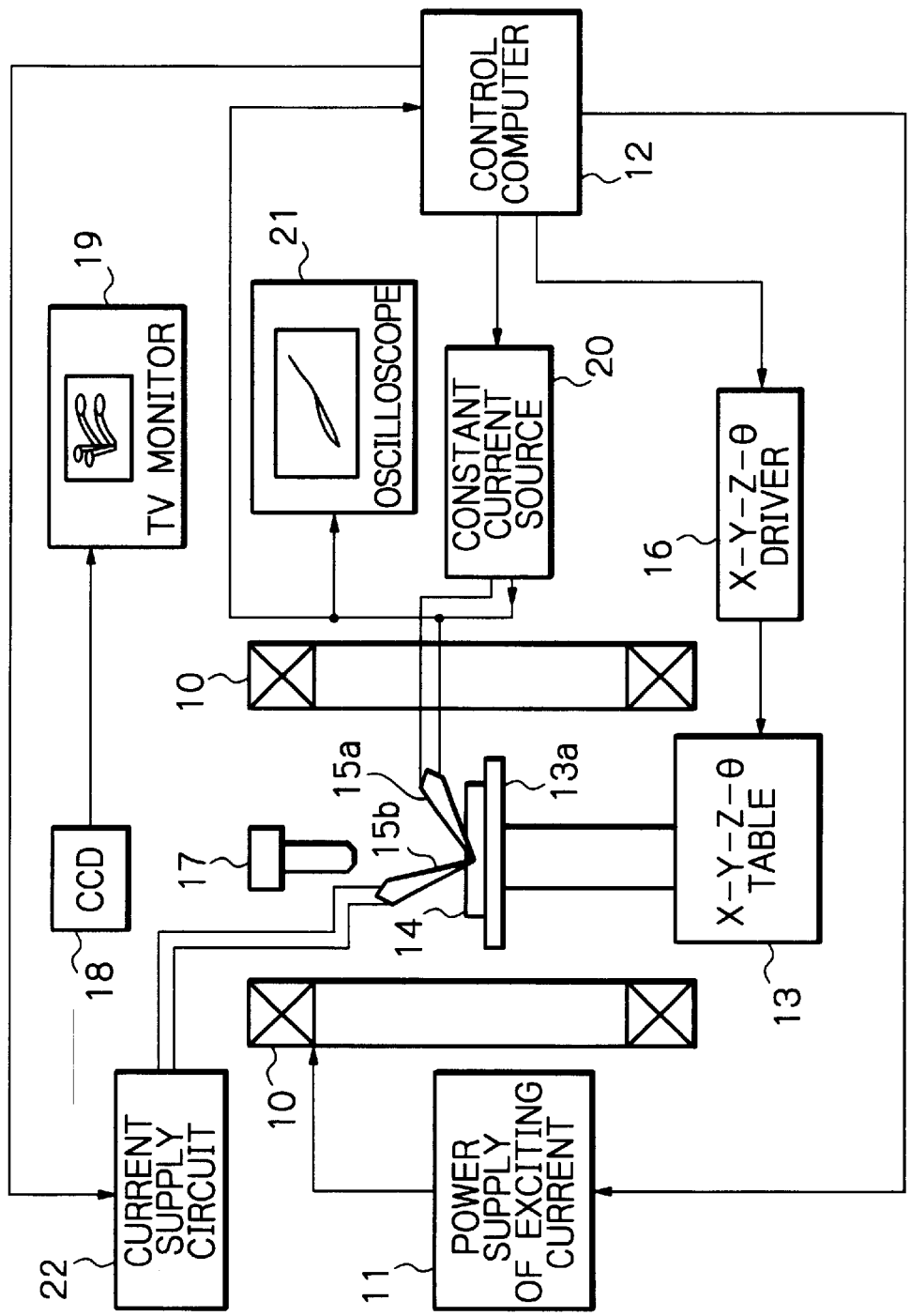
FIG. 1 is a block diagram schematically showing a circuit structure of a preferred embodiment of an apparatus for testing a composite type magnetic head, according to the present invention.

FIG. 1 schematically illustrates the embodiment of the apparatus for testing a composite type magnetic head including a write head portion with the inductive element and a read head portion with the MR element. The test apparatus of this embodiment is constituted by a ρ-H tester.

In the figure, reference numeral 10 denotes a Helmholtz coil (air-core coil) for producing an external alternating magnetic field to be applied to the MR element of the composite type magnetic head. In this embodiment, the Helmholtz coil 10 is arranged such that its longitudinal axis is vertically directed (up-down direction in the figure). A power supply 11 for providing exciting current to the Helmholtz coil 10 is electrically connected to this Helmholtz coil 10. A control computer 12 controls the power supply 11. In the Helmholtz coil 10, a platform 13a of a X-Y-Z-θ table 13 and a head block (bar) 14 temporally fixed on the platform 13a are disposed.

The head block 14 is provided by forming a large number of composite type magnetic heads arranged in matrix on a wafer according to thin-film technology, by cutting the wafer into bar shaped blocks so that each block has the aligned magnetic heads, and by grinding an Air Bearing Surface (ABS) 14a (FIG. 3) of the head block 14 so as to adjust gap-depth (MR height) of the heads. Thus, the head block 14 has a plurality of aligned composite type magnetic heads that are not individually separated yet.

Figure 3:
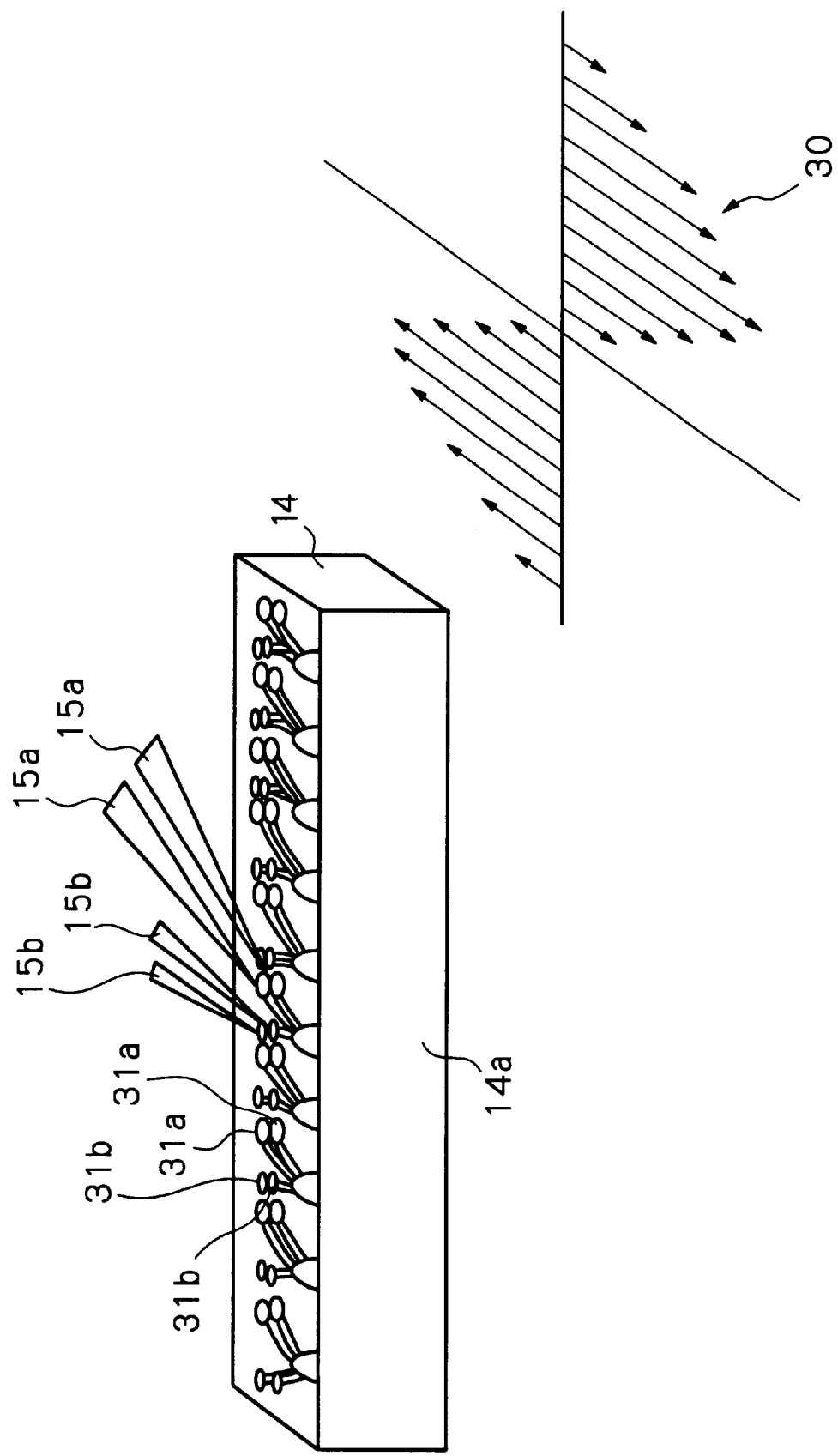
FIG. 3 is a view illustrating electrodes of the tested magnetic head on a head block and probe pins of the test apparatus and also illustrating an external alternating magnetic field applied to the head block.

First probe pins 15a are fixed at a standstill position and the head block 14 is aligned with the first probe pins 15a. This alignment is performed by the X-Y-Z-θ table 13 driven by the X-Y-Z-θ driver 16 so that the first probe pins 15a can electrically contact with output terminals 31a of the MR element of the magnetic head to be tested, formed on the head block 14, as illustrated in FIG. 3. The alignment of the output terminals 31a with respect to the first probe pins 15a can be monitored by means of a CCD camera 18 which picks up image of this alignment portion via an optical system 17 such as an objective lens and by means of a TV monitor 19. The X-Y-Zθ driver 16 is controlled by the control computer 12.

Second probe pins 15b are also fixed at a standstill position and the head block 14 is aligned with the second probe pins 15b. This alignment is also performed by the X-Y-Z-θ table 13 driven by the X-Y-Z-θ driver 16 so that the second probe pins 15b can electrically contact with input terminals 31b of the inductive element of the magnetic head to be tested, formed on the head block 14, as illustrated in FIG. 3. The alignment of the input terminals 31b with respect to the second probe pins 15b also can be monitored by means of the CCD camera 18 and the TV monitor 19. In practice, the first and second probe pins 15a and 15b are integral with each other and thus the alignment of the probe pins 15a and 15b with respect to the respective terminals 31a and 31b will be simultaneously performed.

The second probe pins 15b are electrically connected to a current supply circuit 22 which can control polarity and level of providing current. Thus, from this current supply circuit 22, one of various kinds of current with positive and/or negative polarities is provided to the inductive element of the magnetic head via the second probe pins 15b.

The first probe pins 15a are electrically connected to a constant current source 20 for supplying a sense current to the MR element. The first probe pins 15a are also connected to an oscilloscope 21 for displaying wave shape of output voltage from the MR element and to the control computer 12 which receives and analyzes this output voltage.

The power supply 11, the X-Y-Z-θ driver 16, the constant current source 20 and the current supply circuit 22 are connected to the computer 12 and perform predetermined processes in response to commands from the computer 12.

Figure 2:
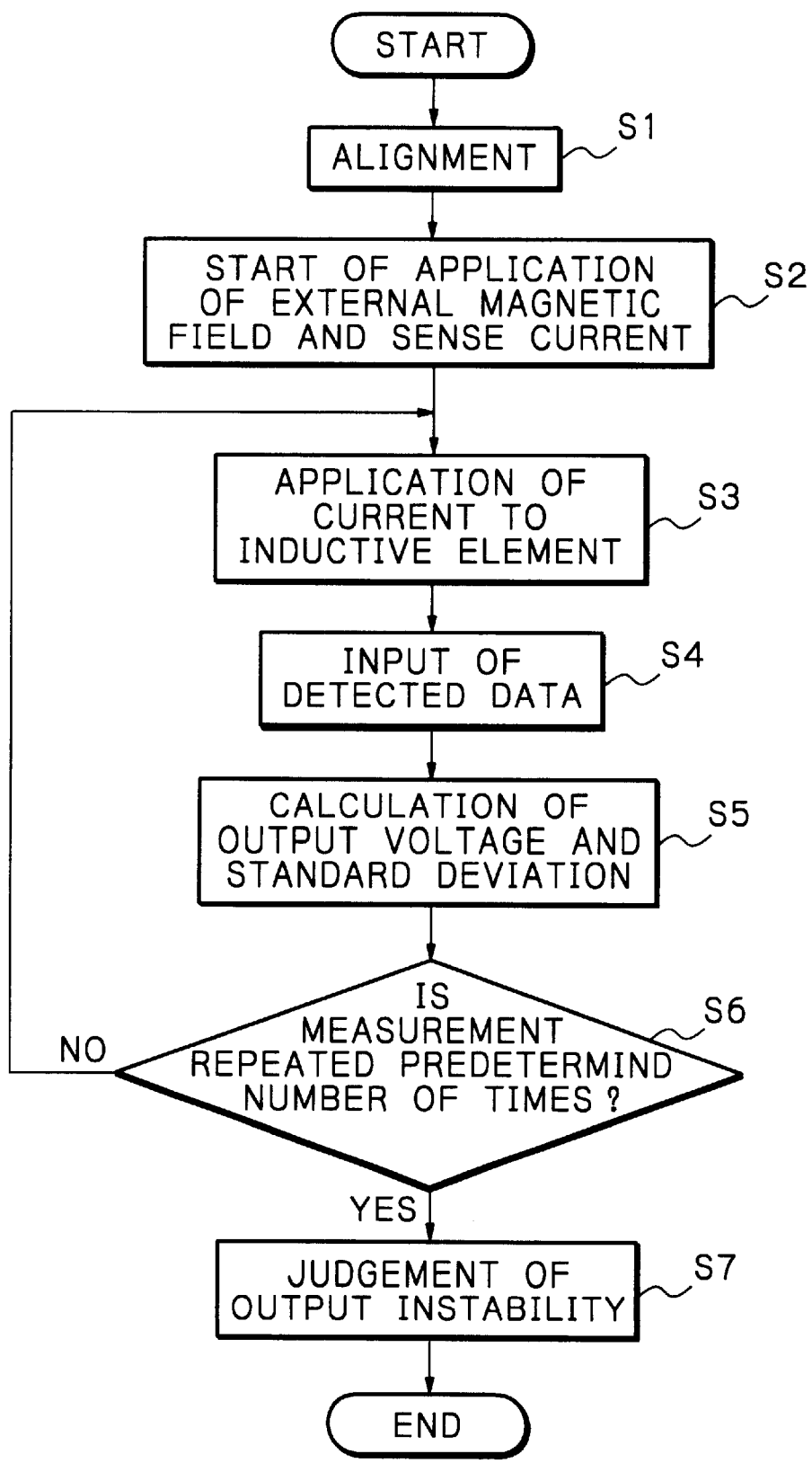
FIG. 2 is a flow chart schematically illustrating a part of control program of a computer shown in FIG. 1.

Referring to FIG. 2 which is a flow chart schematically illustrating a part of control program of the computer 12, the method of testing the composite type magnetic head will be described in detail.

First, at step S1, alignment of the output terminals of the MR element and the input terminals of the inductive head of the magnetic head to be tested on the head block 14 which is fixed on the platform 13a of the X-Y-Z-θ table 13, with the first and second probe pins 15a and 15b, respectively, is executed. This alignment will be performed by moving the X-Y-Z-θ table 13 by means of the X-Y-Z-θ driver 16 in accordance with instruction from the computer 12 using an well known alignment technique.

At step S2, intensity and frequency of the external alternating magnetic field from the Helmholtz coil 10 are determined, and then application of the magnetic field to the head block 14 is started. As is well known, the Helmholtz coil produces magnetic field with intensity that is proportional to the applied current in a direction along its longitudinal axis. Thus, at step S2, the computer 12 instructs magnitude and frequency of drive current to the power supply 11. The drive current has an alternating wave shape such as sine wave shape and its frequency is at the commercial frequency or more up to microwave frequency for example. At step S2, also, application of the sense current to the MR element of the magnetic head to be tested is started by providing instruction to the constant current source 20 from the computer 12.

FIG. 3 illustrates an external alternating magnetic field applied to the head block 14. This direction of the external magnetic field is the same direction as that of magnetic field applied to the magnetic head practically flying above the magnetic medium, namely is a direction perpendicular to the ABS 14a of the head block 14. Wave shape of the external magnetic field is, as shown by a reference numeral 30 in FIG. 3, alternating sine wave. Intensity of the external magnetic field is preferably that practically applied to the MR head from the magnetic medium for example several tens Oe. However, the intensity of the magnetic field applied to the head block 14 can be optionally selected within a range of 1 to 500 Oe. FIG. 3 also illustrates that the first probe pins 15a electrically contacts with the output terminals 31a of the MR element of the magnetic head to be tested and the second probe pins 15b electrically contacts with the input terminals 31b of the inductive element of the magnetic head to be tested.

Then, at step S3, a plurality of currents are applied to the inductive element in the magnetic head to be tested by providing instruction to the current supply circuit 22 from the computer 12. In this embodiment, polarities of the currents applied to the inductive element before respective measurement alternate. Before the first measurement, a single rectangular wave shape current with one polarity for example positive polarity and with a predetermined duration so as to finally fall to zero from the positive polarity after the predetermined duration is applied. The amplitude of the current is selected to the maximum permissible current level for the inductive element or less.

After the application of the such rectangular current, output voltage across the output terminals of the MR element, corresponding to resistance of the MR element, is detected under a condition where the external alternating magnetic field and the sense current are applied to the MR element. This detection should be carried out for a time equal to or longer than one period of the external magnetic field. The detected output voltage is provided to the computer 12 and A/D converted into digital input data at step S4.

At the next step S5, the input data is analyzed. Namely, the computer 12 calculates, from the input data which represents wave shapes of the MR loop (ρ-H loop), a peak to peak output voltage and its standard deviation σ. For this purpose, the input data representing the output voltage variation when the external alternating magnetic field is applied for at least one period should be prepared.

Thereafter, at step S6, it is judged whether the measurement processes at steps S3 to S5 are repeated by a predetermined number of times or not. If not, the program will return to step S3.

According to the present invention, output characteristics of the MR element is measured under a condition wherein possible instability of the output of the MR element will be intentionally induced by forcefully applying to the inductive element a current which will change an initial magnetization state of a shield layer for the MR element. However, since it is impossible to previously know that, for each MR element, which polarity of the applied current will change the initial magnetization state of the shield layer, the output characteristics of each MR element should be measured by using a plurality of currents with positive and negative polarities, respectively. Thus, in this embodiment, at least twice measurements each applying a current with different polarity to the inductive element are executed.

Before the second measurement, at step S3, a single rectangular wave shape current with the other polarity for example negative polarity is applied to the inductive element of the magnetic head to be tested by providing instruction to the current supply circuit 22 from the computer 12. This current finally falls to zero from the positive polarity after a predetermined duration. The amplitude of the current is selected to the maximum permissible current level for the inductive element or less.

Similar to at the first measurement, after the application of the such rectangular current, output voltage across the output terminals of the MR element is detected under a condition where the external alternating magnetic field and the sense current are applied to the MR element. The detected output voltage is provided to the computer 12 and A/D converted into digital input data at step S4. Then, at the next step S5, the input data is analyzed as well as at the first measurement.

After at least one basic unit of measurement which is constituted of the aforementioned first and second measurements is executed, whether instability of the output of the MR element is occurred or not is judged depending upon the calculated peak to peak output voltage and its standard deviation σ so as to know whether the tested magnetic head is a good article or not at step S7. The increased number of executed basic units of measurement will result the improved probability of detection of the output instability.

Figure 4A:
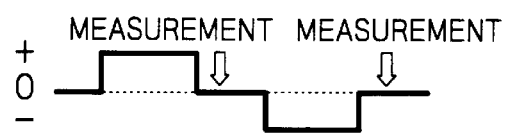
FIGS. 4a to 4f are graphs illustrating various ways for applying current to an inductive element head and various ways for measuring output characteristics of a MR element.

FIG. 4a illustrates the way for applying current to the inductive element head and the way for measuring output characteristics of the MR element according to the above-mentioned embodiment. Namely, in this embodiment, output characteristics of the MR element is first measured after a rectangular wave shape current which falls to zero from one polarity is applied to the inductive element, then the output characteristics of the MR element is measured after a rectangular wave shape current which falls to zero from the other polarity is applied to the inductive element. Depending upon the measured output characteristics, whether instability of the output of the MR element is occurred or not is judged.

Figure 4B:
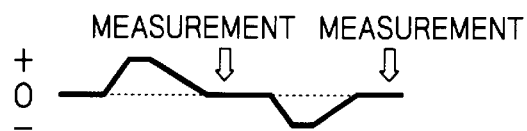

Instead of the rectangular wave shape currents, another current may be used. As shown in FIG. 4b, output characteristics of the MR element is first measured after a current which gradually decreased to zero from one polarity is applied to the inductive element, then the output characteristics of the MR element is measured after a current which gradually decreased to zero from the other polarity is applied to the inductive element. Depending upon the measured output characteristics, whether instability of the output of the MR element is occurred or not is judged. It is important, according to the invention, that the output characteristics of the MR element is detected after a current which finally falls to zero from one polarity is applied to the inductive element, and the output characteristics of the MR element is detected after a current which finally falls to zero from the other polarity is applied to the inductive element.

Figure 4C:
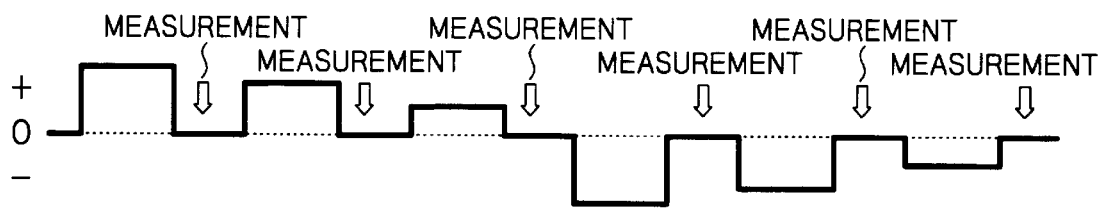

In a modification, as shown in FIG. 4c, output characteristics of the MR element is measured after a current which finally falls to zero from one polarity is applied to the inductive element, and this measurement is repeated twice or more without alternately changing the polarity of the applied currents but changing its level. Then, the output characteristics of the MR element is measured after a current which finally falls to zero from the other polarity is applied to the inductive element, and this measurement is repeated twice or more without alternately changing the polarity of the applied currents but charging its level. Depending upon the measured output characteristics, whether instability of the output of the MR element is occurred or not is judged.

Figure 4D:
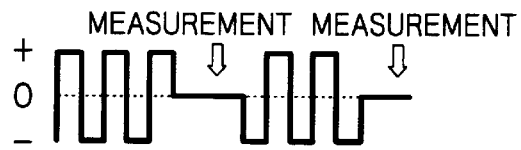

Alternately, instead of the single rectangular wave shape current, an alternating rectangular wave shape current with a predetermined frequency may be used. As shown in FIG. 4d, output characteristics of the MR element is first measured after the applied alternating rectangular current with the oscillation frequency finally falls to zero from the positive polarity, then the output characteristics of the MR element is measured after the applied alternating rectangular current with the oscillation frequency finally falls to zero from the negative polarity. Depending upon the measured output characteristics, whether instability of the output of the MR element is occurred or not is judged.

Figure 4E:
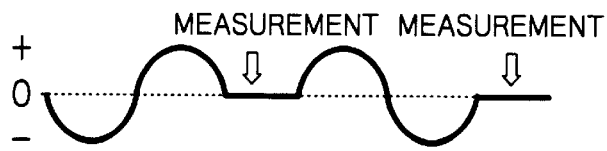

Instead of the rectangular wave shape current, sinusoidal wave shape current with a predetermined frequency is used. As shown in FIG. 4e, output characteristics of the MR element is first measured after the applied sinusoidal current falls to zero from the positive polarity, then the output characteristics of the MR element is measured after the applied sinusoidal current finally falls to zero from the negative polarity. Depending upon the measured output characteristics, thus whether instability of the output of the MR element is occurred or not is judged.

Figure 4F:
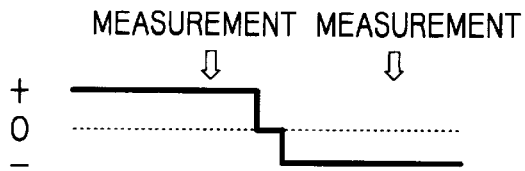

The output characteristics of the MR element may be measured not after the current is applied and finished, but during the current is flowing. Namely, as shown in FIG. 4f, output characteristics of the MR element is first measured while a direct current with the positive polarity is flowing, then the output characteristics of the MR element is measured while a direct current with the negative polarity is flowing. Depending upon the measured output characteristics, whether instability of the output of the MR element is occurred or not is judged.

In a further modification, the wave shape and also the level of the current applied to the inductive element may be different between the positive and negative polarities. In other words, any current with a sufficient level and a sufficient duration which cause the shield layer of the MR element to saturate and to change its initial magnetization state can be used as the current applied to the inductive element.

Described hereinafter are actual test results of possible instability of the output of MR elements of composite type magnetic heads provided with the MR elements and inductive elements, respectively. The tests were executed by measuring the output characteristics of the MR elements by using a ρ-H tester and by calculating the standard deviations σ as aforementioned.

The tested magnetic heads are composite type magnetic heads with spin valve MR elements. The tests were executed with respect to 27 magnetic head samples aligned on a head block (bar).

Table 1 represents resistance values, average output voltages of 6 times measurements, before each measurement no current being applied to the respective inductive elements (no current case), standard deviations σ of the 6 output voltages at the no current case, average output voltages of 6 times measurements, before each measurement positive current with a predetermined level (25 mA) being applied to the respective inductive elements for a predetermined period of time (100 msec) (positive current case), standard deviations σ of the 6 output voltages at the positive current case, average output voltages of 6 times measurements, before each measurement positive or negative current with one of predetermined levels as shown in FIG. 4c (+25 mA, +15 mA, +5 mA, −5 mA, −15 mA, −25 mA) being applied to the respective inductive elements for a predetermined period of time (100 msec) (positive and negative current case), and standard deviations σ of the 6 output voltages at the positive and negative case, with respect to the 27 magnetic head samples, respectively. Also, Table 2 represents output voltages of the MR element at the 6 measurements with respect to the magnetic head sample of No. 19 in Table 1.

TABLE 1

| Sample Nos. | Resistance Values (Ω) | Average Output Voltages (μV) | | | Standard Deviations σ | | |
|---|---|---|---|---|---|---|---|
| | | No Current Case | Positive Current Case | Positive and Negative Current Case | No Current Case | Positive Current Case | Positive and Negative Current Case |
| 1 | 42.4 | 486.2 | 502.1 | 500.7 | 2.9 | 5.1 | 9.2 |
| 2 | 39.8 | 42.5 | 48.2 | 48.0 | 3.7 | 4.4 | 9.5 |
| 3 | 42.9 | 502.9 | 499.5 | 506.0 | 3.5 | 9.2 | 6.7 |
| 4 | 41.6 | 500.7 | 521.2 | 521.9 | 3.4 | 12.1 | 5.8 |
| 5 | 41.4 | 440.1 | 472.8 | 484.2 | 1.1 | 14.9 | 4.2 |
| 6 | 40.6 | 386.8 | 430.5 | 427.0 | 4.8 | 8.9 | 8.0 |
| 7 | 40.1 | 726.1 | 694.4 | 697.6 | 5.6 | 4.0 | 9.4 |
| 8 | 39.7 | 311.3 | 308.8 | 309.4 | 2.4 | 2.9 | 4.7 |
| 9 | 40.4 | 391.4 | 410.6 | 402.0 | 4.6 | 2.5 | 10.4 |
| 10 | 40.5 | 668.3 | 665.7 | 668.3 | 5.8 | 3.1 | 5.3 |
| 11 | 40.7 | 569.9 | 577.4 | 577.2 | 2.9 | 5.7 | 5.9 |
| 12 | 40.5 | 311.5 | 319.8 | 316.0 | 5.8 | 8.1 | 5.6 |
| 13 | 40.9 | 736.3 | 882.6 | 895.4 | 3.7 | 65.6 | 64.2 |
| 14 | 40.8 | 498.0 | 495.8 | 496.4 | 2.5 | 6.6 | 5.1 |
| 15 | 40.4 | 563.2 | 567.0 | 564.2 | 4.8 | 9.5 | 15.2 |
| 16 | 40.4 | 516.2 | 542.6 | 541.4 | 3.3 | 9.9 | 11.2 |
| 17 | 40.4 | 344.6 | 339.4 | 342.4 | 6.5 | 2.6 | 9.6 |
| 18 | 40.2 | 562.9 | 558.5 | 559.3 | 6.5 | 11.1 | 12.9 |
| 19 | 39.5 | 631.3 | 696.2 | 678.5 | 5.0 | 4.3 | 27.5 |
| 20 | 40.4 | 777.0 | 787.2 | 799.6 | 3.4 | 5.3 | 16.7 |
| 21 | 42.5 | 911.3 | 983.3 | 988.8 | 5.5 | 6.4 | 9.6 |
| 22 | 42.4 | 481.8 | 485.6 | 507.6 | 4.4 | 6.4 | 45.1 |
| 23 | 42.3 | 716.8 | 688.1 | 687.3 | 2.8 | 25.7 | 31.1 |
| 24 | 43.6 | 741.8 | 714.7 | 720.6 | 5.8 | 7.3 | 13.7 |
| 25 | 44.3 | 872.0 | 877.1 | 874.2 | 3.3 | 8.9 | 5.8 |
| 26 | 43.5 | 629.7 | 631.3 | 632.5 | 3.8 | 3.8 | 3.1 |
| 27 | 43.0 | 613.0 | 637.6 | 632.7 | 5.0 | 1.8 | 9.4 |
| Average Values | 41.3 | 553.1 | 568.1 | 569.6 | 4.2 | 9.5 | 13.5 |

TABLE 2

| Measurement No. | Output Voltages (μV) | | |
|---|---|---|---|
| | No Current Case | Positive Current Case | Positive and Negative Current Case |
| 1 | 633.5 | +25 mA 689.7 | +25 mA 705.6 |
| 2 | 636.2 | +25 mA 703.1 | +15 mA 693.4 |
| 3 | 622.6 | +25 mA 694.6 | +5 mA 690.9 |
| 4 | 629.9 | +25 mA 699.5 | −5 mA 700.7 |
| 5 | 637.2 | +25 mA 697.0 | −15 mA 639.6 |
| 6 | 628.7 | +25 mA 693.4 | −25 mA 640.9 |
| Average Values | 631.3 | 696.2 | 678.5 |

As will apparent from Table 1, the standard deviations σ tend to take the smallest values at the no current case, larger values at the positive current case and the largest values at the positive and negative case. This result indicates that the output instability of the MR element will most easily show up when currents with positive and negative polarities are applied to the inductive element (at positive and negative current case).

the present invention intends to intentionally give external influence to the MR element by applying a current to the inductive element so as to provide a state in which an initial magnetization state of the shield layer for the MR element will change. Indeed, the output instability will be more frequently occurred at the positive current case than the no current case. But, depending upon the initial magnetization direction of the shield layer, no external influence may be given to the MR element if only one polarity (positive polarity) current is applied. Thus, currents with positive and negative polarities are applied to the inductive element so as to more easily induce possible instability of the output of the MR element.

The magnetic head samples of Nos. 13 and 23 in Table 1 are examples that the initial magnetization state of these shield layers happened to be changed and thus output instability were exhibited by applying positive current only. The magnetic head samples of Nos. 19 and 22 in Table 1 are another examples that the initial magnetization state of these shield layers were not changed by applying positive current only but were changed and thus output instability were exhibited by additionally applying the negative current. It should be noted that a normal or good magnetic head never exhibit such instability of the output of the MR element even when such positive and negative currents which will induce change in an initial magnetization state of the shield layer of the MR element.

Table 2 shows the tested data of the above-mentioned magnetic head sample of No. 19 in Table 1. As will be noted from this Table 2, the output voltage greatly changed from about 700 μV to about 640 μV when the negative current of −15 mA was applied before the measurement. Thus, at this stage, the initial magnetization state of the shield layer of the MR element was changed to induce the output instability of the MR element.

Various conditions in the above-mentioned actual tests, particularly kind, wave shape, level (amplitude), frequency and application period of time of the current applied to the inductive elements are mere examples. Therefore, the present invention can be actually embodied without being limited to these specific examples.

Since a ρ-H tester is used in the aforementioned embodiment, the testing procedure can be executed from magnetic heads aligned on and not yet individually separated from the head block 14. Thus, it is unnecessary to practically operate the finished head on the rotating disk, causing the testing procedure to extremely make simple and shorten. Furthermore, from the electromagnetic conversion characteristics, the computer 12 can easily and quickly judge whether the head is good article or not.

The similar testing procedure can be executed during wafer stage before making the head block if it is done after the read head portion with the MR element and its shield layer and the write head portion with the inductive element.

The testing procedure may be done after each of the magnetic heads is individually separated from the head block, after the magnetic head is assembled with a suspension, or after the head and suspension assembly is attached in a magnetic disk drive device.

FIG. 5 schematically illustrates another embodiment of the apparatus for testing a composite type magnetic head including a write head portion with the inductive element and a read head portion with the MR element. A head tester constitutes the test apparatus of this embodiment.

In the figure, reference numeral 50 denotes the composite type magnetic head having the write head portion with the inductive element 51 and the read head portion with the MR element 52, 53 denotes a head read/write current control IC, 54 and 55 denote head amplifiers, 56 denotes a measurement unit, 57 denotes a computer and 58 denotes a D/A converter, respectively.

Input terminals of the inductive element 51 and output terminals of the MR element 52 of the head 50 are electrically connected to the head read/write current control IC 53. The output terminals of the MR element 52 are also connected to the measurement unit 56 via the head amplifiers 54 and 55. Thus, a current similar to that in the embodiment of FIG. 1 is applied to the inductive element 51 from the head read/write current control IC 53, and a sense current is applied to the MR element 52 from the head read/write current control IC 53. Of course, external alternating magnetic field is applied to the MR element 52 from the testing magnetic medium. The output voltages from the MR element 52 are applied to the measurement unit 56 to measure its output characteristics. The computer 57 calculates an average output voltage and a standard deviation σ of the output voltages so as to know whether the tested magnetic head is a good article or not. Thus, by using the head tester as described above, the same result as that of the embodiment of FIG. 1 can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for testing a magnetic head having a magnetoresistive effect element with at least one shield layer and an inductive element, said method comprising:

a current application step of applying a current to said inductive element, said current changing an initial magnetization state of said shield layer for said magnetoresistive effect element; and a measurement step of measuring output characteristics of said magnetoresistive effect element.

2. The method as claimed in claim 1, wherein said current application step includes a step of applying a direct current with a predetermined polarity to said inductive element, and wherein said measurement step includes a step of measuring output characteristics of said magnetoresistive effect element while said applied direct current is flowing.

3. The method as claimed in claim 1, wherein said current application step includes a step of applying a current which finally falls to zero from a predetermined polarity to said inductive element, and wherein said measurement step includes a step of measuring output characteristics of said magnetoresistive effect element after application of said current is finished.

4. A method for testing a magnetic head having a magnetoresistive effect element and an inductive element, said method comprising:

a first current application step of applying a first current with one polarity to said inductive element;

a first measurement step of measuring output characteristics of said magnetoresistive effect element;

a second current application step of applying a second current with the other polarity to said inductive element; and a second measurement step of measuring output characteristics of said magnetoresistive effect element.

5. The method as claimed in claim 4, wherein said first and second current application steps include steps of applying the first and second currents which are direct currents to said inductive element, and wherein said first and second measurement step include steps of measuring output characteristics of said magnetoresistive effect element while said applied direct currents are flowing, respectively.

6. The method as claimed in claim 4, wherein said first current application step includes a step of applying a first current which finally falls to zero from one polarity to said inductive element, wherein said second current application step includes a step of applying a second current which finally falls to zero from the other polarity to said inductive element, and wherein said first and second measurement step include steps of measuring output characteristics of said magnetoresistive effect element after application of said first and second currents are finished, respectively.

7. The method as claimed in claim 6, wherein each of said first and second currents is a single rectangular wave shape current with a predetermined duration.

8. The method as claimed in claim 6, wherein each of said first and second currents is an alternating rectangular wave shape current with a predetermined frequency.

9. The method as claimed in claim 6, wherein each of said first and second currents is a sinusoidal wave shape current with a predetermined frequency.

10. An apparatus for testing a magnetic head having a magnetoresistive effect element with at least one shield layer and an inductive element, comprising:

a first current application means for applying a current to said inductive element, said current changing an initial magnetization state of said shield layer for said magnetoresistive effect element;

a second current application means for applying a sense current to said magnetoresistive effect element; and measurement means for measuring output characteristics of said magnetoresistive effect element by receiving output voltage from said magnetoresistive effect element each time said current is applied to said inductive element from said first current application means while said sense current is flowing.

11. The apparatus as claimed in claim 10, wherein said first current application means includes means for applying a direct current with a predetermined polarity to said inductive element, and wherein said measurement means includes means for measuring output characteristics of said magnetoresistive effect element while said applied direct current is flowing.

12. The apparatus as claimed in claim 10, wherein said first current application means includes means for applying a current which finally falls to zero from a predetermined polarity to said inductive element, and wherein said measurement means includes means for measuring output characteristics of said magnetoresistive effect element after application of said current is finished.

13. An apparatus for testing a magnetic head having a magnetoresistive effect element with at least one shield layer and terminals, having an inductive element with terminals, and having an air bearing surface, said apparatus comprising:

probe means for electrically contacting to said terminals of said magnetoresistive effect element and to said terminals of said inductive element;

a first current application means for applying a current to said inductive element through said probe means, said current changing an initial magnetization state of said shield layer for said magnetoresistive effect element;

means for applying external magnetic field to said magnetic head, said external magnetic field being perpendicular to said air bearing surface;

a second current application means for applying a sense current to said magnetoresistive effect element through said probe means; and measurement means for measuring output characteristics of said magnetoresistive effect element by receiving output voltage from said magnetoresistive effect element through said probe means each time said current is applied to said inductive element from said first current application means while said sense current and said external magnetic field are being applied.

14. The apparatus as claimed in claim 13, wherein said first current application means includes means for applying a direct current with a predetermined polarity to said inductive element, and wherein said measurement means includes means for measuring output characteristics of said magnetoresistive effect element while said applied direct current is flowing.

15. The apparatus as claimed in claim 13, wherein said first current application means includes means for applying a current which finally falls to zero from a predetermined polarity to said inductive element, and wherein said measurement means includes means for measuring output characteristics of said magnetoresistive effect element after application of said current is finished.

16. An apparatus for testing a magnetic head having a magnetoresistive effect element and an inductive element, comprising:

a first current application means for applying a first current with one polarity and a second current with the other polarity to said inductive element;

a second current application means for applying a sense current to said magnetoresistive effect element; and measurement means for measuring output characteristics of said magnetoresistive effect element by receiving output voltage from said magnetoresistive effect element when said first current is applied to said inductive element from said first current application means while said sense current is being applied, and for measuring output characteristics of said magnetoresistive effect element by receiving output voltage from said magnetoresistive effect element when said second current is applied to said inductive element from said first current application means while said sense current is being applied.

17. The apparatus as claimed in claim 16, wherein said first current application means includes means for applying the first and second currents which are direct currents to said inductive element, and wherein said measurement means includes means for measuring output characteristics of said magnetoresistive effect element while said applied first and second direct currents are flowing, respectively.

18. The apparatus as claimed in claim 16, wherein said first current application means includes means for applying a first current which finally falls to zero from one polarity and a second current which finally falls to zero from the other polarity to said inductive element, and wherein said measurement means includes means for measuring output characteristics of said magnetoresistive effect element after application of said first and second currents are finished, respectively.

19. The apparatus as claimed in claim 18, wherein said first current application means includes means for applying said first and second currents, each of said first and second currents being a single rectangular wave shape current with a predetermined duration.

20. The apparatus as claimed in claim 18, wherein said first current application means includes means for applying said first and second currents, each of said first and second currents being alternating rectangular wave shape current with a predetermined frequency.

21. The apparatus as claimed in claim 18, wherein said first current application means includes means for applying said first and second currents, each of said first and second currents being a sinusoidal wave shape current with a predetermined frequency.

22. An apparatus for testing a magnetic head having a magnetoresistive effect element with at least one shield layer and terminals, having an inductive element with terminals, and having an air bearing surface, said apparatus comprising:

probe means for electrically contacting to said terminals of said magnetoresistive effect element and to said terminals of said inductive element;

a first current application means for applying a first current with one polarity and a second current with the other polarity to said inductive element through said probe means;

means for applying external magnetic field to said magnetic head, said external magnetic field being perpendicular to said air bearing surface;

a second current application means for applying a sense current to said magnetoresistive effect element through said probe means; and measurement means for measuring output characteristics of said magnetoresistive effect element by receiving output voltage from said magnetoresistive effect element through said probe means when said first current is applied to said inductive element from said first current application means while said sense current and said external magnetic field are being applied, and for measuring output characteristics of said magnetoresistive effect element by receiving output voltage from said magnetoresistive effect element through said probe means when said second current is applied to said inductive element from said first current application means while said sense current and said external magnetic field are being applied.

23. The apparatus as claimed in claim 22, wherein said first current application means includes means for applying the first and second currents which are direct currents to said inductive element, and wherein said measurement means includes means for measuring output characteristics of said magnetoresistive effect element while said applied first and second direct currents are flowing, respectively.

24. The apparatus as claimed in claim 22, wherein said first current application means includes means for applying a first current which finally falls to zero from one polarity and a second current which finally falls to zero from the other polarity to said inductive element, and wherein said measurement means includes means for measuring output characteristics of said magnetoresistive effect element after application of said first and second currents are finished, respectively.

25. The apparatus as claimed in claim 24, wherein said first current application means includes means for applying said first and second currents, each of said first and second currents being a single rectangular wave shape current with a predetermined duration.

26. The apparatus as claimed in claim 24, wherein said first current application means includes means for applying said first and second currents, each of said first and second currents being alternating rectangular wave shape current with a predetermined frequency.

27. The apparatus as claimed in claim 24, wherein said first current application means includes means for applying said first and second currents, each of said first and second currents being a sinusoidal wave shape current with a predetermined frequency.

* * * * *